United States Patent [19]

Bloom

[11] Patent Number: 4,698,674
[45] Date of Patent: Oct. 6, 1987

[54] INTERLACE/NON-INTERLACE DATA CONVERTER

[75] Inventor: Leslie E. Bloom, Ypsilanti, Mich.

[73] Assignee: VSP, Inc., Ann Arbor, Mich.

[21] Appl. No.: 836,550

[22] Filed: Mar. 6, 1986

[51] Int. Cl.[4] .............................................. H04N 7/01
[52] U.S. Cl. ..................................... 358/140; 358/160
[58] Field of Search ........................ 358/140, 141, 160

[56] References Cited

U.S. PATENT DOCUMENTS

| | | | |
|---|---|---|---|
| 4,148,070 | 4/1979 | Taylor | 358/140 |
| 4,573,080 | 2/1986 | Maze | 358/160 |
| 4,603,348 | 7/1986 | Yamada | 382/44 |
| 4,658,293 | 4/1987 | Arai | 358/140 |

*Primary Examiner*—Howard W. Britton
*Attorney, Agent, or Firm*—Basile and Hanlon

[57] ABSTRACT

A data converter for converting interlaced formatted video data into a non-interlaced format for storage in a memory. Converter circuitry is connected between the video data source and a memory under the control of a central processing unit for controlling the generation of memory addresses to control the storage of data in the memory in interlaced/non-interlaced format or to read out such data from the memory in either interlaced or non-interlaced format.

6 Claims, 8 Drawing Figures

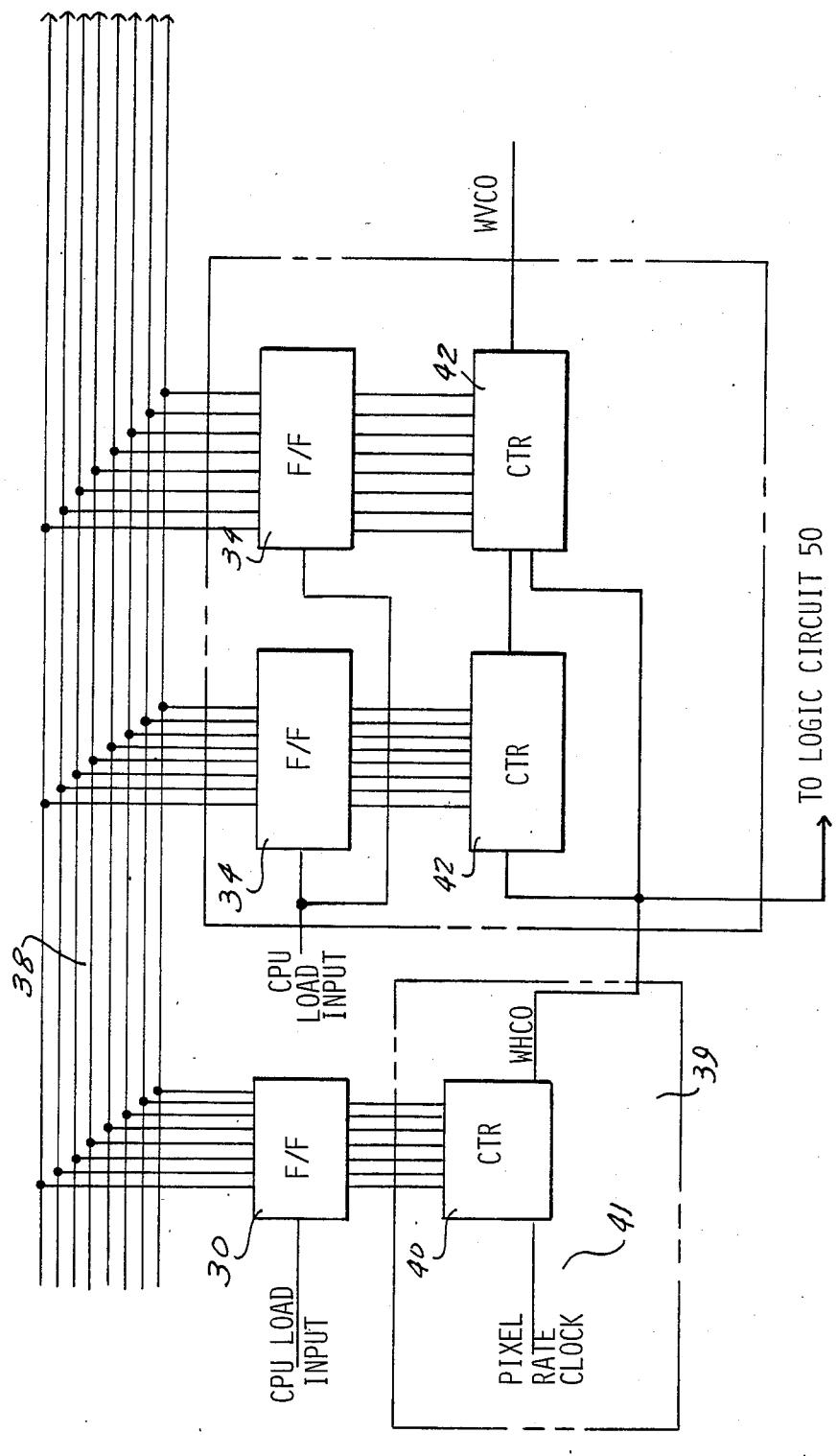

INTERLACE/NON-INTERLACE DATA CONVERTER

BACKGROUND OF THE INVENTION

1. Field of the Invention

The present invention relates to television camera or other output data systems and, more specifically, to camera output data systems which convert sequentially digitized interlaced data from a television camera or other data source into non-interlaced form for storage in a memory.

2. Description of the Prior Art

In modern digital electronic imaging systems, typically used in machine vision part quality inspection and measurement applications, etc., the analog output data from a television camera which corresponds to a digitized visual image is stored in digital form in a computer memory for subsequent comparison with pre-set values, dimensions and other image algorithm operations, as well as enabling such data to be enhanced to provide increased clarity, filtered to decrease noise, enhance edges and further matched against stored template images or otherwise mathematically manipulated.

In normal operation, a camera scans the field of vision or frame line by line. Each scan line has a finite resolution limit which can be effectively represented by a number of light responsive picture elements or pixels. The number of scan lines and the number of pixels per frame vary depending on the resolution capabilities of each camera. For example, cameras may have 256 pixels per scan line and 256 scan lines per frame. Analog video outputs from high resolution cameras are often able to be digitized such that they provide 512×512 or 1024×1024 pixels per scan line by scan lines per frame.

In operation, as the camera sequentially outputs each scan line, analog voltage values are generated corresponding to the incident light integrating an electrical charge at each particular location on the camera photosensitive element. These values are converted, usually in a host computer containing a high-speed analog to digital converter, into digital form, typically, but not limited to, between 0 and 255 values on the gray scale, to provide an indication of the intensity of the image of each particular picture element or pixel.

Historically, television camera scan rates developed as a result of then current CRT phosphor persistence, deflection electronic characteristics and other complexities, etc., resulting in the development of standards, such as EIA RS170A, NTSC, CCIR, and others. EIA is an acronym for the Electronic Industries Association RS170A, a subset of the NTSC (National Television Systems Committee standard). European countries use the international CCIR (Consultive Committee International Radio) standard which is similar to but not compatible with the RS170A standard. These standards led to interlacing of camera output data in which an odd field and an even field of video information is generated at a rate of 1/50$^{th}$ to 1/60$^{th}$ of a second per field.

Each odd field contains data corresponding to each pixel in each odd numbered scan line on a sequential basis as shown in FIG. 1. FIG. 1 illustrates the sequential output from the camera, with each dot representing one pixel data value in each scan line. Thus, the camera outputs data on the odd numbered scan lines (i.e. 1, 3, 5, etc) for each frame followed by the even numbered scan line data (i.e., 2, 4, 6, etc.). In by the even numbered scan line data (i.e., 2, 4, 6, etc.). In machine vision applications, the camera output is digitized and stored in a memory in odd and even blocks identical to that shown in FIG. 1 as the data is received by the memory with the whole even numbered scan line data following the odd numbered scan line data.

This separates the data corresponding to vertically adjacent pixels in the image from each other within the computer memory and leads to difficulties when such vertically adjacent pixel values must be mathematically or otherwise manipulated for image enhancement, correlations, filtering, measurement or other similar imaging operations. Such procedures usually involve comparing a particular pixel value with its surrounding pixel values or changing a pixel value relative to its "neighborhood" pixels. The computer processing required to select the appropriate pixel element values for processing is made more complex due to the separation of the odd and even field pixel values within the computer memory resulting in larger programs as well as a slower processing time. This reduces computer throughput which can effectively slow down part production when a machine vision system employing such an imaging system is used in a real time environment.

Thus, it would be desirable to provide a data converter which overcomes the problems with previously devised data converters in managing camera output data. It would also be desirable to provide a data converter which stores interlaced digitized, sequential camera output data in a computer memory in a manner which enables easy manipulation of such data for subsequent processing. It would also be desirable to provide a data converter which stores sequential, digitized interlaced camera output data in a computer memory in a non-interlaced form in real time with no additional computer processing time required. Finally, it would be desirable to provide a data converter which stores interlaced camera output data in a non-interlaced matter in a computer memory and, yet, enables such data to be read out for further processing or for display on a monitor in either of an interlaced or non-interlaced form.

SUMMARY OF THE INVENTION

The present invention is a data converter which converts sequentially digitized interlaced camera output data in real time to non-interlaced form for storage in a computer memory.

A central processing unit controls the transfer of information between a camera, the data converter and a memory. The central processing unit initializes various registers in the data converter to indicate the odd and even field starting data addresses, the number of scan lines per field, the number of pixels per scan line and a pre-selected horizontal address offset value to insure that the data is stored in consecutive locations in the memory despite being output from the camera in interlaced form consisting of a field of successive odd numbered scan lines followed by a field of successive even numbered scan lines.

An identical set of circuitry is also provided for reading out the data from the memory for display on a monitor or television in interlaced or non-interlaced form or for subsequent processing for enhancement or other algorithmic operations.

The data converter of the present invention overcomes many of the problems associated with the storage of camera data output since such data can be conveniently stored in real time in sequential locations within a computer memory despite it being generated by the camera in interlaced or alternating odd and even fields. This simplifies subsequent processing of the camera output data since the data representing horizontally adjacent, vertically spaced pixel elements in each camera frame are located in correct sequential proximity with each other in the computer memory. This simplifies processing of the data for enhancement or other machine vision algorithmic functions. Further, such camera data output storage is achieved without delay in computer processing time since the data converter operates in a real time mode and also enables the data to be read out from the memory in either interlaced or non-interlaced form depending upon the application to which the camera output data converter of the present invention is applied.

BRIEF DESCRIPTION OF THE DRAWING

The various features, advantages and other uses of the present invention will become more apparent by referring to the following detailed description and drawing in which:

FIGS. 4A and 4B are schematic diagrams showing the detailed circuitry of certain elements of the data converter shown in FIG. 3;

DESCRIPTION OF THE PREFERRED EMBODIMENTS

Figures 1, 6, 7:
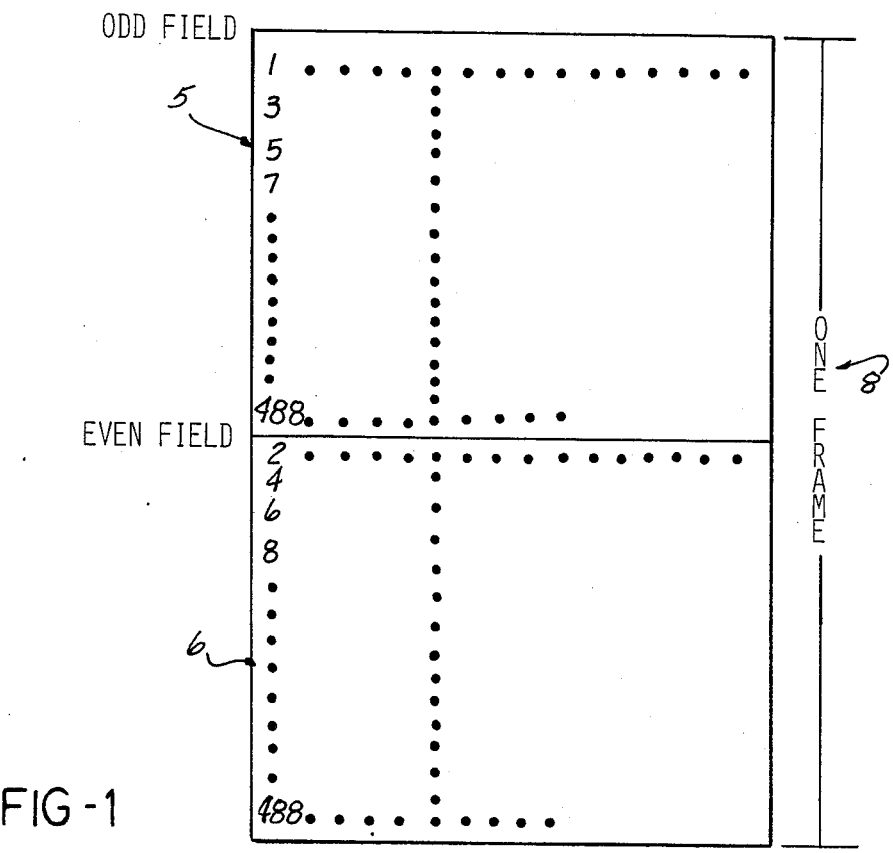
FIG. 1 is a representation of a standard frame of interlaced data as it is output from a television camera in odd and even fields.
FIG. 6 is a representation of the storage of data in a memory in non-interlaced format by the data converter of the present invention.
FIG. 7 is a representation of data storage in another embodiment of the present invention.

Throughout the following description and drawing, an identical reference number is used to refer to the same component shown in multiple figures of the drawing.

Figure 2:
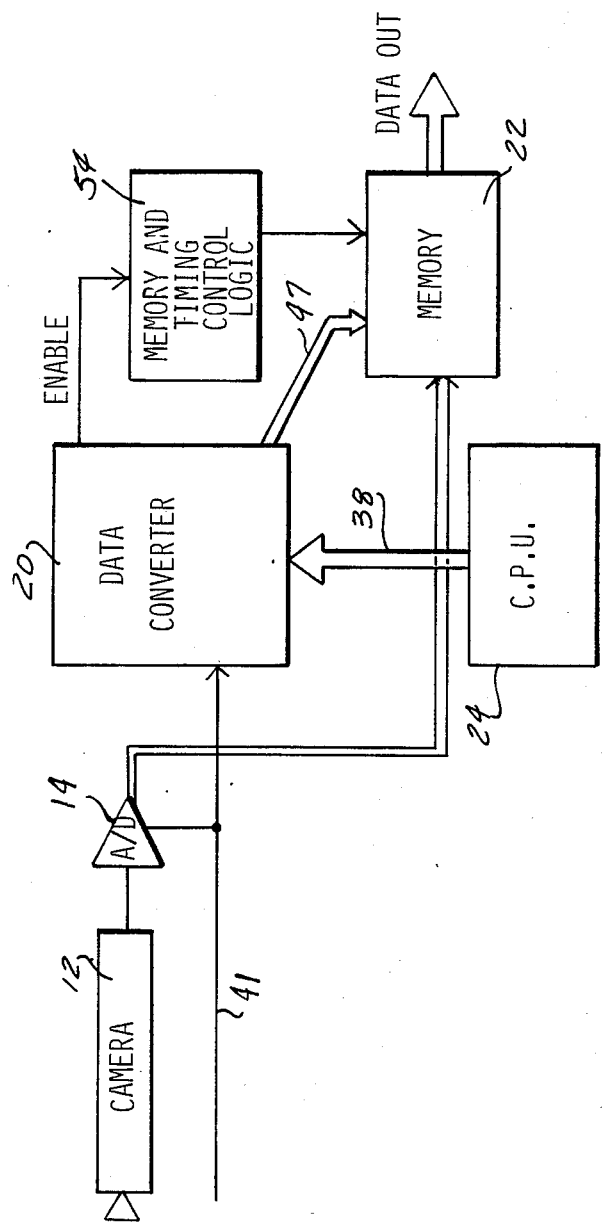
FIG. 2 is a block diagram illustrating the data converter of the present invention.

Referring now to the drawing, and to FIG. 2 in particular, there is illustrated a data converter 20 which converts sequentially digitized interlaced output data from a television camera 12 or other data source into non-interlaced data for storage in a computer memory 22 under the control of a central processing unit 24. The data may be read out from the memory 22 in either non-interlaced or interlaced form and output to additional signal processing devices such as a display monitor, etc.

As shown in FIG. 2, the output from a television camera 12, such as a camera based upon a vidicon-type tube or an area-array from a solid state television camera or other type of camera data output source, such as a VCR., etc., is input to an analog/digital converter 14. As is well known, the camera 12 scans the field of view in a number of horizontal passes or scan lines. The light sensitive face of the camera 12 has a resolution specification which can be represented as a number of picture elements or pixels in each scan line. The number of scan lines per frame and the number of pixels per scan line vary depending upon the camera specifications and type. For example, the camera 12 may be capable of providing approximately 256, 512 or 1024 scan lines, with 256, 512 or 1024 pixels or picture elements in each scan line. For purposes of illustration and example only, the present invention will be described for use with a camera providing 525 scan lines per interlaced frame or 262.5 scan lines per field and 512 pixels per scan line.

It should also be noted that although there are 262.5 scan lines per field, it is standard that a small number of these scan lines occur during the vertical retrace or blanking time which allows the camera and/or receiving television monitor electron beam to return to the top of the frame. For purposes of this invention only, and further, only by way of example and not limitation, the data converter of this invention will be described as receiving only 244 of the totally available 262.5 scan lines per field which contain active video data. The remaining scan lines occur during the vertical retrace blanking period.

In operation, the camera 12 generates an analog voltage at each picture element or pixel 4, as shown in FIG. 1, which is proportional to the amount of incident light on the camera element at that point. It is this analog voltage camera output which is converted by the analog/digital converter 14, which may or may not be part of the camera 12, into a digital value. In a typical camera 12, the output from the camera 12 is generated in an interlaced fashion, shown in FIG. 1, in which the data or pixel values on the odd numbered scan lines 1, 3, 5, etc., are first sequentially output by the camera 12 in an odd field 5 before the camera 12 outputs the pixel values on even numbered scan lines 2, 4, 6, etc., in an even field 6. Thus, the data is output from the camera 12 through the analog to digital (A/D) converter 14 in a first odd field 5 followed by a second even field 6 for each complete frame 8.

The output from the A/D converter 14 is input to the memory 22 under the control of the data converter 20 which converts the data from an interlaced format as received from the camera 12 to a non-interlaced format for storage in the memory 22. The control of the data flow as well as the inputs and the initializing values for the data converter 20 are generated by a central processing unit 24. The central processing unit 24 may be any conventional, microprocessor based computer which is under user program and input control to provide instructions and inputs determining the manner in which the data is to be stored in or read out from the memory 22. Also, the memory 22 may be of any desired configuration and size depending upon the particular application to which the data converter 20 is to be applied. Such a memory 22 typically has a number of storage locations, or bytes, each containing a pre-set number of bits, or storage locations, such as 8, 16, etc. Each memory location stores one pixel value and the number of bits per each addressable memory location stores a digital representation of the gray scale value of the pixel as generated by the A/D converter 14. Each memory location is accessible by a unique address in the memory 22. Thus, each memory location, comprised of 8, 16 etc., bits, has an address from 0 up to the limit of the memory.

Figure 3:
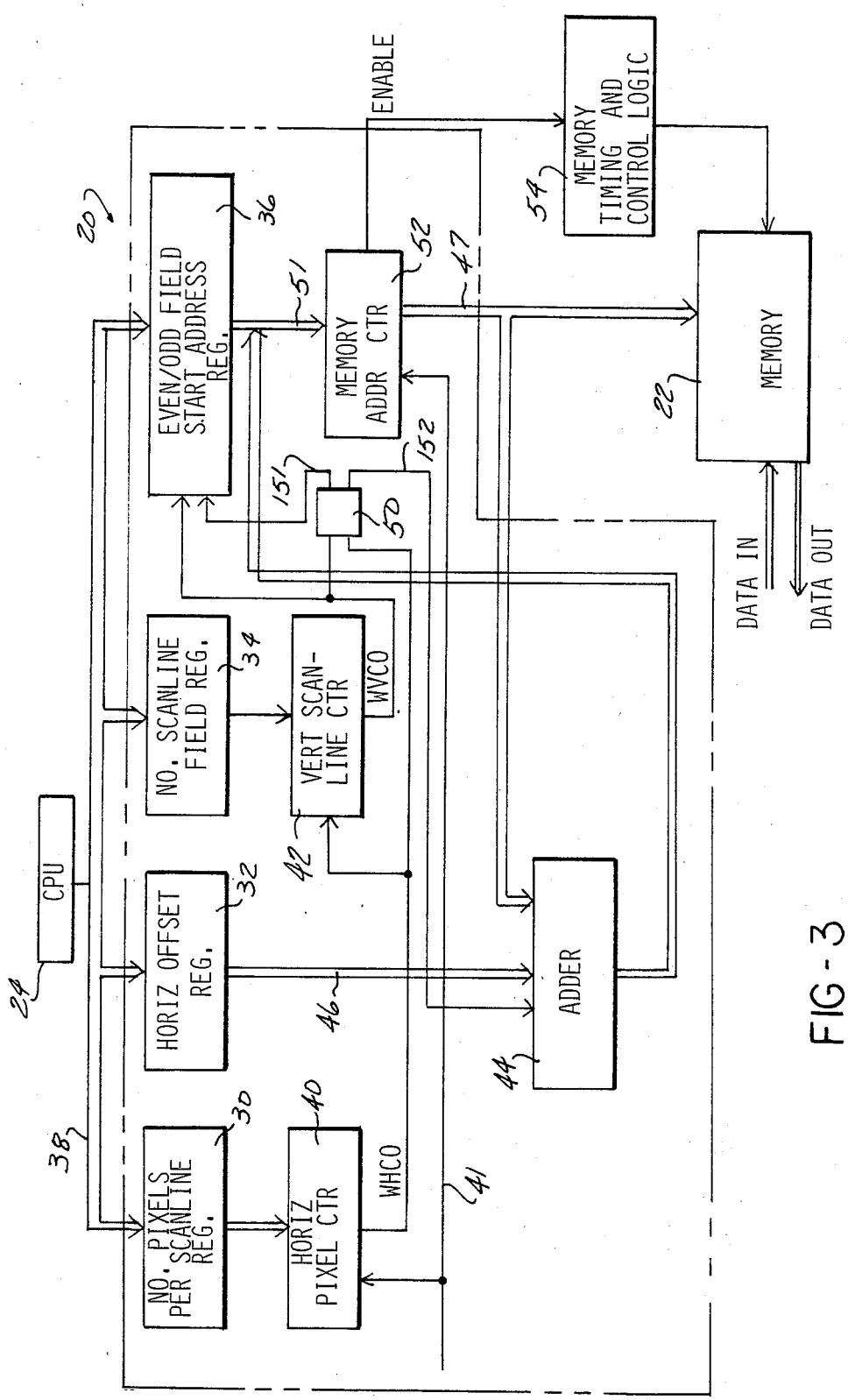
FIG. 3 is a detailed block diagram showing the main elements of the data converter of the present invention.
Figure 4B:
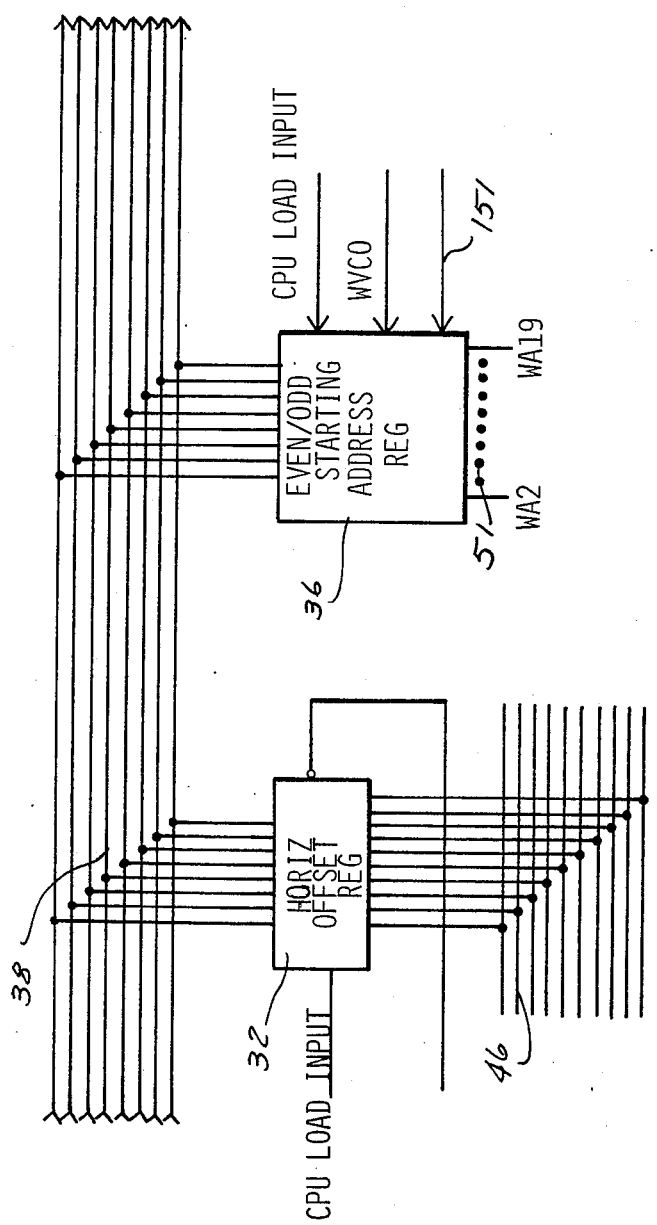

Referring now to FIG. 3, there is illustrated a block diagram of the data converter 20 of the present invention. In general, the data converter 20 includes four registers 30, 32, 34 and 36 which respectively contain data indicating the number of pixels per scan line, a horizontal offset value, which will be described in greater detail hereafter, the number of scan lines per field and the even and odd field starting memory addresses. The registers 30, 32, 34 and 36 are connected to the central processing unit 24 by a data bus 38 as depicted in FIGS. 3, 4A and 4B. Each of the registers 30, 32, 34 and 36 are connected in parallel to the data bus 38 so that the central processing unit 24 under the control of its control program may input appropriate values into the various registers initializing the operation of the data converter 20 as described hereafter.

Figure 5:
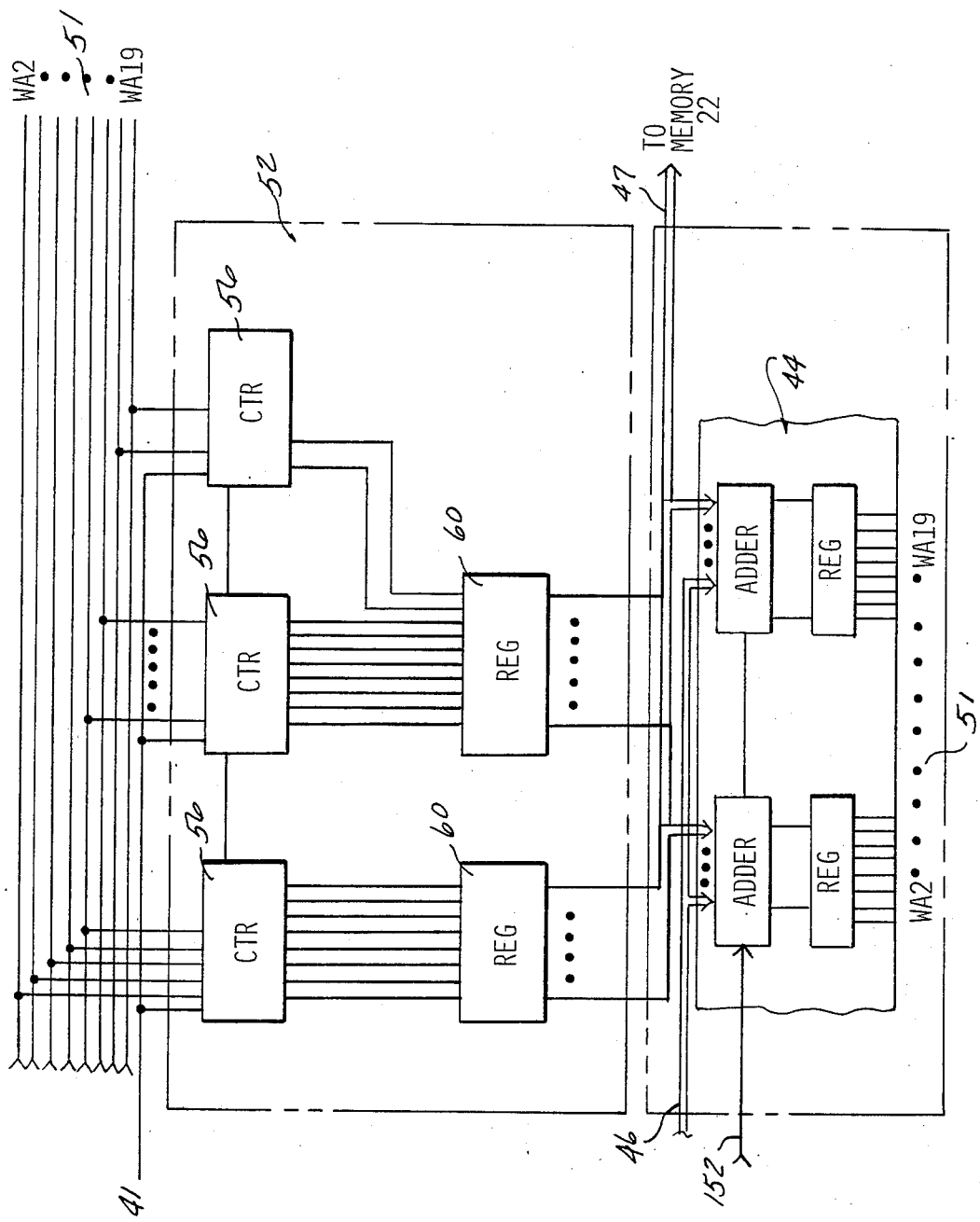
FIG. 5 is a schematic diagram illustrating the detailed circuitry of other elements of the data converter shown in FIG. 3.

Referring to FIGS. 4A, 4B and 5, the register 30 is formed of an octal D flip-flop having eight inputs and eight outputs. The inputs are connected to the data bus 38 as shown in FIG. 4A. The outputs from the register 30 are connected to a counter 40 which counts the number of pixels per scan line from the A/D converter 14 by a pixel rate clock signal 41. In operation, the central processing unit 24 will load a value or data number into the register 30 indicating the number of pixels in each scan line. This number which, in the present example, is 512 pixels per scan line, will be loaded into the counter 40 under the control of appropriate timing signals. The counter 40 will count down to zero upon receiving successive input signals indicating each new pixel value generated by the camera 12 and A/D converter 14 and will generate a signal labeled WHCO (Write Horizontal Carry Out) when it reaches "0". This indicates that the pre-selected number of pixels in each scan line have been received and the next set of pixels will be from the next horizontally spaced scan line in the camera frame. The signal WHCO is input to a vertical scan line counter 42 and a logic circuit 50 which controls the loading of a memory address counter 52.

The central processing unit 24 also inputs through the data bus 38 a data value indicating a preset horizontal offset which is stored in the horizontal offset register 32. The output of the horizontal offset register 32 is connected as an input to an adder 44.

The horizontal offset is a data value which reserves in the memory 22 a pre-determined number of memory locations corresponding to the number of pixels in each scan line of each camera output frame. This value reserves a sufficient number of memory locations in the memory 22 between the memory locations storing the first and third odd field scan line data for the second even field scan line data which is generated in the next field scan by the camera 12 so as to place successive odd and even scan lines in correct, non-interlaced, consecutive order within the memory 22 thereby converting the interlaced output from the camera 12 to a non-interlaced format in the memory 22 for more efficient processing.

The central processing unit 24 also inputs a numeric value through the data bus 38 to the register 34 indicating the number of scan lines for each odd and even field 5 and 6 in each frame. In the present example, the numeric input from the central processing unit 24 has a value of 244 indicating 244 scan lines per odd field and 244 scan lines per even field for a combined total of 488 scan lines in two consecutive scans of the camera 12 of each complete camera frame. Again, these values are used only for illustrative purposes since they are common in the relevant industry and reflect the current state of the art. However, any other values may also be employed in the data converter 20.

The register 34 is formed of two octal D flip-flops 34 which are connected at their inputs at the data bus 38 and at their outputs to the pre-load inputs of two, sight-bit, synchronized, cascaded counters which form the vertical scan line counter 42. The countdown input to the vertical scan line counter 42 is the WHCO output signal from the horizontal pixel counter 38.

Finally, the central processing unit 24 inserts initializing values into the even/odd field starting address register 36 indicating the starting address of each odd and even field. As shown in FIG. 4B, the register 36 receives the input from the data bus 38 and outputs the starting address on data bus 51 to the memory address counter 52. The output from the memory address counter 52 on data bus 47 is input to the adder 44 and through a memory timing and control logic circuit 54 to the memory 22.

As shown in FIG. 5, the memory address counter 52 is formed of a plurality of cascaded connected counters 56 which receive their inputs from the data bus 51 which is comprised of the output of the even/odd field starting address register 36 and the adder 44. The outputs from the counters 56 are input to registers 60 which, under apropriate timing controls, output data to the adder 44. The output from the adder 44 is, in turn, re-input via the data bus 51 to the memory address counter 52.

In operation, prior to the start of each scan by the camera 12, the central processing unit 24 will input initializing data into the registers 30, 32, 34 and 36 indicating the number of pixels per scan line, the horizontal offset, the number of scan lines per field and the even and odd starting addresses, respectively. Video information in the form of a serial stream of digitized pixel data is then received from the A/D converter 14 which outputs each digitized pixel value in sequential order. The horizontal pixel counter 40 is decremented and the memory address counter 52 is incremented simultaneously by the pixel clock rate signal 41 upon the input of each clock signal 41.

At the beginning of each field, the control logic 50 will select through the data bus 51 the odd starting field memory address and input this address pixel number into the memory address counter 52. In FIG. 1, this address is indicated as being addres 1 which contains 8 or 16 bits of information to store the received data from the A/D converter 14 and camera 12. Thus, the number of pixels per scan line loaded through the scan line counter register 30 into the horizontal pixel counter 40 is such that the output of the horizontal pixel counter 40 will be decremented upon the receipt of each pixel rate clock pulse 41 indicating receipt of one pixel data or value from the A/D converter 14. Simultaneously, the memory address counter 52 will be incremented such that the data from the A/D converter 14 is placed in the proper address location in the memory 22.

When the prescribed number of pixels have been received for each scan line, such as 512 in the example described above, the output of the horizontal pixel counter 40 will be at "zero" and will generate a signal WHCO which is received by the vertical scan line counter 42 and the logic circuit 50. The logic circuit 50 via the select output 151 inputs data onto the bus 51 from the even/odd field start address register 36 or via the select output 152 from the output of the adder 44 dependent upon the WHCO and WVCO inputs. The adder 44 has a current data value which is the additive quantity of the horizontal offset counter 32 (512 in the present example) and the current output from the memory address counter 52. This information is passed on the data bus 51 into the memory address counter 52 thereby generating an address at the output of the memory address counter 52 which reserves 512 memory address locations in the memory 22 for the first line of even field data when it is subsequently received from the camera 12. The new address output from the memory address counter 52 in the present example will now be 1025 as shown in FIG. 6. Thus, the second odd field line of data will be stored at consecutive memory locations starting with address 1025. This operation continues through the entire odd field of data 4 until the vertical scan line counter 42 reaches "0" thereby indicating that a complete field of data has been received from the A/D converter 14.

Upon generation of a count of zero "WVCO" (Write Vertical Carry Out) from the vertical scan line counter 42 indicating receipt of a complete interlaced field of data (244 scan lines in this example), a signal is sent to the control logic 50 which inputs data from the even-/odd field starting address register 36 onto the data bus 51. The even/odd field starting address register 36 is then clocked by the output from the vertical scan line counter 42 to generate the even field starting address. This is input via the data bus 51 into the memory address counter 52 such that the first scan line of even field data from the A/D converter 14 is input into the appropriate address memory locations in the memory 22, i.e., 513, 1537, etc., as shown in FIG. 6.

In the present example, the even field starting address will be 513 such that the first pixel data value is stored at this location in the memory 22 immediately subsequent to the last bit of odd field data in the first scan line thereby placing vertically spaced pixel values in adjacent memory locations in the memory 22.

The operation of the horizontal pixel counter 30 and the vertical scan line counter 42 as well as the adder 44 and the memory address counter 52 in placing the vertical scan line data in the appropriate locations between or which have been reserved in the memory 22 between previously stored odd field data values is the same as that described above. At the completion of a complete frame of data from the A/D converter 14, the interlaced data received from the camera 12 will be stored in the memory 22 in non-interlaced format with vertically and sequentially spaced pixel values stored in sequential order in the memory 22.

It should be noted that the schematic block shown in FIGS. 4A, 4B and 5 are representative of basic counter and register circuitry. It should also be understood that such counters and registers may be formed of a plurality of individual chips on components, either discrete or in a large scale integrated circuit, to provide the desired 4, 8 or 16 bit functions required by such elements.

It will also be understood that the above-identified description pertains only to the writing or storage of data from the camera 12 in the memory 22 and converting it from interlaced format to a non-interlaced form. Circuitry, not shown since it is identical to that illustrated in FIGS. 3, 4A, 4B and 5, is employed for reading or outputting the stored information from the memory 22 for subsequent processing by the central processing unit 24 or any other processing circuit or for display on a monitor or television. For clarity such duplication of identical circuitry has not been shown in the drawing; but it will be understood that such forms a part of the present invention.

Another important feature of the present invention is the capability via the circuitry described above to store or read out only a small portion of the output data from the camera 12. This so-called "windowing" capability enables a particular part of the image to be subsequently analyzed or processed, such as one edge of a part being viewed by the camera 12.

Referring to FIG. 7, there is illustrated a block of data 70 stored within the memory 22. By way of example only, the data is stored in non-interlaced format in the memory 22. However, it will be understood that the "windowing" capability of this invention is equally usable with interlaced data. While the camera 12 and A/D converter 14 continually output each pixel element in each scan line of an interlaced or non-interlaced output for of a particular field of vision, only a selected portion of this data may be stored in memory 22 for a particular application, such as viewing one edge of a part for inspection purposes, etc. In creating such a "window effect" for the storage of data within the memory 22, the horizontal offset value input to the horizontal offset register 32 from the CPU 24 is provided with an appropriate value 72 equalling the number of memory addresses from the end of each scan line and the number of memory addresses 74 from the beginning of each scan line, that is, the next vertically adjacent scan line in the field, to the beginning of the window or block of data. These values may be selected as appropriate for a particular viewing and data required. Accordingly, appropriate values can be placed in the horizontal offset register 32 and the even/odd starting address register 36 as well as the register and counters 30 and 38 defining the number of pixels per scan line and its associated counter 38 and the number of scan lines per field in register 34 and its associated vertical scan line counter 42 to create a desired window within the memory.

It should be noted that when creating such a "window" or block of data in the memory 22 of the desired data, the surrounding data in adjacent memory locations is superfluous and may be ignored for subsequent data processing and memory storage purposes. This decreases computer processing time since only a selected portion of data required for a particular application need be processed and read out from the memory 22. Again, this information is stored in non-interlaced format within the memory 22 such that vertically adjacent pixels are stored in appropriate memory locations within the memory 22 for fast processing and access. The windowed data stored in the memory 22 may be read out in either interlaced or non-interlaced form as required by the particular application, display or processing equipment, etc.

In summary, there has been disclosed a unique data converter which converts interlaced camera output data into non-interlaced format when stored in the memory. This enables such data to be sequentially stored in a memory at the high input rates from the camera in real time as well as simplifying subsequent processing since reformatting of the data by subsequent computer processing to a non-interlaced form is not required. The data converter of the present invention is also adaptable for various screen sizes, data transfer rates, and storage/read out applications in machine vision, part quality inspection and other applications.

What is claimed is:

1. A data converter receiving video interlaced scan line data input and connected to a memory comprising:
means for digitizing the analog input data to digital form;

means for converting interlaced formatted data in separate odd and even numbered scan line fields to non-interlaced, sequential locations in the memory alternating odd and even numbered scan lines of the input video field data; and means for generating a series of addresses for storing the interlaced formatted data in non-interlaced format in the memory.

2. The data converter of claim 1 further including:

a central processing unit for inputting initial information controlling the storage of input data in selected locations within the memory.

3. A data converter receiving digitized interlaced sequential data containing a pre-determined number of pixel elements per scan line in alternating odd/even fields of data per one frame of the camera from a video source and connected to a memory for storing such data, the data converter comprising:

control means for controlling the flow of data between the video source and the memory;

first means for storing the number of pixel elements per scan line;

second means for storing a memory address offset value;

third means for storing the number of scan lines per field; and fourth means for storing the even and odd field memory starting addresses; and wherein the values in the first, second, third and fourth storing means are input to the first, second, third and fourth storing means from the control means.

4. The data converter of claim 3 further including:

memory address generating means for generating a series of sequential memory addresses; and adder means, for adding the current value in the second storing means and the current value in the memory address generating means to generate the next memory address.

5. The data converter of claim 3 further including:

means for counting the number of pixel elements received from the video source in each scan line of the video source; and the counting means generating an output when the number of pixel elements received equals the preset value in the first storing means.

6. The data converter of claim 5 further including:

means receiving as inputs the outputs from the fourth storage means and the adder means for switching the input to the memory address counter between the fourth storing means and the adder means.

* * * * *